United States Patent
Nishi et al.

(10) Patent No.: US 8,316,388 B2
(45) Date of Patent: Nov. 20, 2012

(54) SHAFT SUPPORTING STRUCTURE WITH COIL SPRING FOR PRESSING SHAFT ONTO BEARING, AND OPTICAL DISC APPARATUS INCLUDING THE SAME

(75) Inventors: Tatsuro Nishi, Osaka (JP); Naohisa Tanabe, Kyoto (JP); Seiichi Miyamoto, Osaka (JP); Masakazu Ishizuka, Hyogo (JP)

(73) Assignee: Panasonic Corporation, Osaka (JP)

( * ) Notice: Subject to any disclaimer, the term of this patent is extended or adjusted under 35 U.S.C. 154(b) by 197 days.

(21) Appl. No.: 12/649,402

(22) Filed: Dec. 30, 2009

(65) Prior Publication Data

US 2010/0180285 A1   Jul. 15, 2010

(30) Foreign Application Priority Data

Jan. 7, 2009   (JP) .................. 2009-001398

(51) Int. Cl.
*G11B 7/00* (2006.01)
(52) U.S. Cl. ..................................... 720/677
(58) Field of Classification Search .............. 720/677
See application file for complete search history.

(56) References Cited

U.S. PATENT DOCUMENTS

| | | | |
|---|---|---|---|
| D356,788 S | 3/1995 | Mizusugi et al. | |
| 7,328,444 B2 * | 2/2008 | Izumisawa et al. | 720/675 |
| 7,451,465 B2 * | 11/2008 | Hayashi et al. | 720/675 |
| 2006/0095932 A1 * | 5/2006 | Hara | 720/677 |
| 2006/0190953 A1 | 8/2006 | Nakashima et al. | |

FOREIGN PATENT DOCUMENTS

| | | |
|---|---|---|
| EP | 1 600 959 A2 | 11/2005 |
| JP | 2-29307 | 2/1990 |
| JP | 06-236635 | 8/1994 |
| JP | 06-236635 A | 8/1994 |
| JP | 2002-352531 | 12/2002 |
| JP | 2005-050398 | 2/2005 |
| JP | 2008-282443 | 11/2008 |

OTHER PUBLICATIONS

Supplementary European Search Report for corresponding European Application No. EP 09 82 5635 dated Mar. 28, 2011.
International Search Report and Written Opinion for corresponding Application No. PCT/JP2009/007249 mailed Jan. 26, 2010.

* cited by examiner

*Primary Examiner* — David D Davis
(74) *Attorney, Agent, or Firm* — Renner, Otto, Boisselle & Sklar, LLP

(57) ABSTRACT

The invention allows for restriction of radial and axial movements of a shaft by a simple structure. A shaft supporting structure includes a base (3) provided with a bearing (7), and a first shaft (23) arranged at the bearing (7). The shaft supporting structure further includes a helical torsion spring (4) fitted on the first shaft (23). The base (3) includes a first engagement hole (31a), and a hooked section (74) engaging with first and second arm sections (41, 42) of the helical torsion spring (4), respectively. The helical torsion spring (4) presses the first shaft (23) onto the bearing (7) in a radial direction of the shaft by an elastic force generated by engagement between the first arm section (41) and the first engagement hole (31a) of the base (3), and engagement between the second arm section (42) and the hooked section (74) of the base (3). A portion of the second arm section (42) faces an axial end face of the first shaft (23).

5 Claims, 14 Drawing Sheets

SHAFT SUPPORTING STRUCTURE WITH COIL SPRING FOR PRESSING SHAFT ONTO BEARING, AND OPTICAL DISC APPARATUS INCLUDING THE SAME

TECHNICAL FIELD

The present invention relates to a shaft supporting structure including a base provided with a bearing, and a shaft arranged at the bearing of the base, and to an optical disc apparatus including the shaft supporting structure.

BACKGROUND ART

A structure for supporting an object by a shaft has been employed in various devices. In this structure, the shaft itself is supported by a base, and there are various types of structures for supporting the shaft.

For example, in a shaft supporting structure of Patent Document 1, an end of the shaft is inserted in a bearing hole formed in a casing. This restricts movement of the shaft in the radial direction. The shaft includes a restriction pin penetrating the shaft in the radial direction. A bracket extends from the casing along the shaft. The bracket includes an elongated hole extending parallel to the radial direction of the shaft. An end of the restriction pin is inserted in the elongated hole of the bracket. Movement of the shaft in the axial direction is restricted by the engagement between the restriction pin and the elongated hole.

In a shaft supporting structure of Patent document 2, a coil spring is fitted on the shaft, thereby pressing and fixing the shaft onto a fixing section of a frame by an elastic force of the coil spring. Specifically, the frame includes the fixing section formed by cutting the frame in the shape of L when viewed in plan, and the shaft is arranged at the fixing section. The coil spring is fitted on the shaft. The shaft includes a groove extending in the circumferential direction of the shaft, and the coil spring is fitted in the groove. Two arms extending from the ends of the coil spring are engaged with engagement holes formed in the frame, respectively. The two arms engage with the engagement holes in the frame, while biasing the coil spring to be tightened in the circumferential direction of the coil spring. As a result, the coil spring presses the shaft onto the fixing section of the frame, thereby restricting the radial movement of the shaft. Since the coil spring is fitted in the groove extending in the circumferential direction of the shaft, movement of the coil spring in the axial direction relative to the shaft is restricted. The coil spring is engaged with the engagement holes of the frame as described above, and therefore, it is fixed to the frame. That is, the axial movement of the shaft is restricted by the engagement between the coil spring and the frame, and the engagement between the coil spring and the groove.

Patent Document

PATENT DOCUMENT 1: Japanese Utility Model Application No. H02-29307

PATENT DOCUMENT 2: Japanese Patent Publication No. H06-236635

SUMMARY OF THE INVENTION

Technical Problem

As described above, the shaft is arranged in such a manner that the radial and axial movements of the shaft are restricted. However, the restriction of the radial and axial movements of the shaft inevitably complicates the structure for supporting the shaft. For example, in the shaft supporting structure of Patent Document 1, the restriction pin penetrating the shaft is provided, and the bracket is formed in the casing. Further, in the shaft supporting structure of Patent Document 2, the groove for engaging with the coil spring is formed in the shaft.

In view of the foregoing, the present invention has been achieved. An object of the invention is to restrict the radial and axial movements of the shaft by a simple structure.

Solution To The Problem

The invention is directed to a shaft supporting structure including a base provided with a bearing, and a shaft arranged at the bearing. The shaft supporting structure includes: a coil spring including a coil section fitted on the shaft, and a first arm section and a second arm section extending from both ends of the coil section, respectively, wherein the base includes a first engagement section, and a second engagement section for engaging with the first arm section, and the second arm section of the coil spring, respectively, the coil spring presses the shaft onto the bearing in a radial direction of the shaft by an elastic force generated by engagement between the first arm section and the first engagement section of the base, and engagement between the second arm section and the second engagement section of the base, and a portion of the second arm section faces an axial end face of the shaft.

An optical disc apparatus of the present invention includes: the shaft supporting structure; and an optical pickup slidably supported on the shaft.

Advantages of the Invention

According to the present invention, radial and axial movements of the shaft can be restricted by a simple structure.

DESCRIPTION OF EMBODIMENTS

An embodiment of the present invention will be described in detail with reference to the drawings.

[Embodiment of the Invention]

Figure 1:
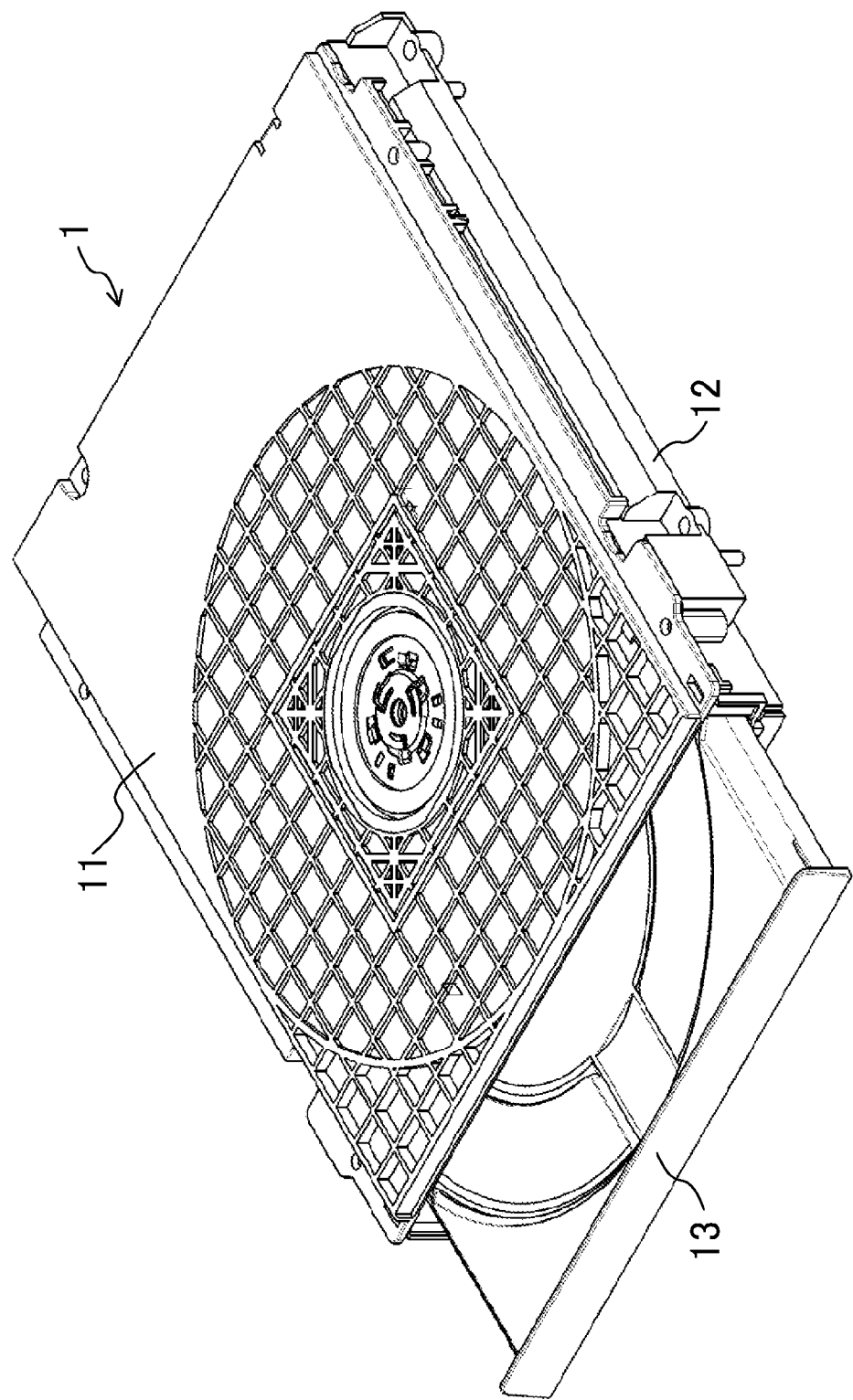
FIG. 1 is a perspective view partially illustrating a drive according to an embodiment of the present invention.
Figure 2:
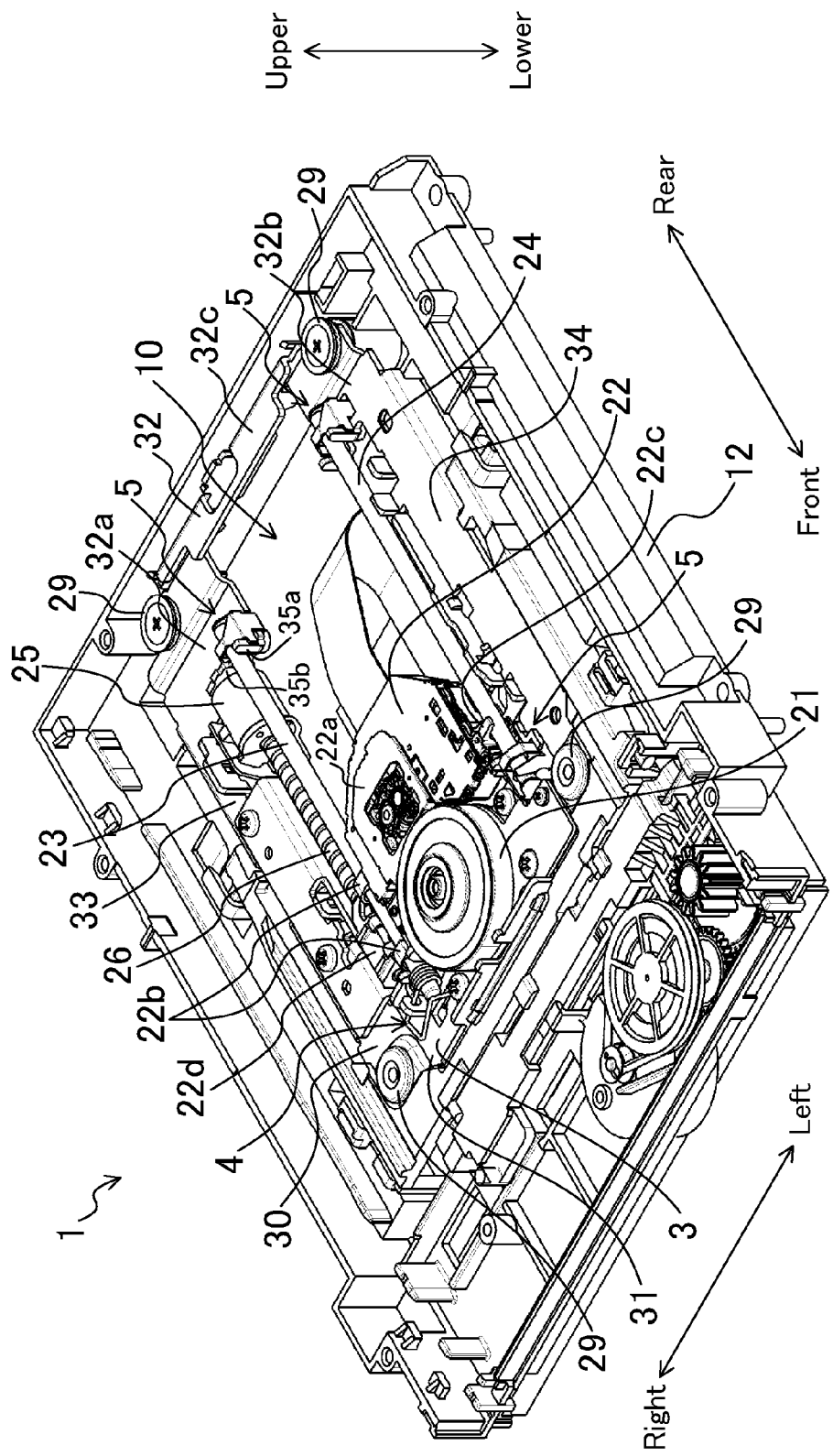
FIG. 2 is a perspective view illustrating the structure of an optical disc apparatus.

FIG. 1 is a perspective view illustrating part of a drive 1 according to an embodiment of the present invention, and FIG. 2 is a perspective view illustrating the structure of an optical disc apparatus 10 from which an upper casing 11 and a tray 13 shown in FIG. 1 are removed.

<1. Structure of Drive 1>

The drive 1 includes an upper casing 11, a lower casing 12, and a tray 13. The upper casing 11 is attached to the lower casing 12. Accordingly, the upper casing 11 and the lower casing 12 constitute a box-shaped casing in which one of side surfaces is opened. The tray 13 is arranged in the casing constituted of the upper casing 11 and the lower casing 12, and is able to enter and exit from the casing through an opening formed in the one of the side surfaces of the casing. The lower casing 12 includes the optical disc apparatus 10.

In the present specification, the position of the upper casing 11 is determined as the "upper" side, and the position of the lower casing 12 is determined as the "lower" side. The direction in which the tray 13 exits from the casing (i.e., the direction of the opening) is regarded as the "front," and the direction in which the tray 13 enters the casing is regarded as the "rear." The directions "right" and "left" are determined relative to the direction toward the "front."

As shown in FIG. 2, the optical disc apparatus 10 includes a base 3, a spindle mechanism 21, an optical pickup 22, a first shaft 23, a second shaft 24, a stepping motor 25, a lead screw 26, a helical torsion spring 4, and three flat spring supports 5, 5, . . . . The spindle mechanism 21, the optical pickup 22, the first shaft 23, the second shaft 24, the stepping motor 25, the lead screw 26, the helical torsion spring 4, and the three flat spring supports 5, 5, . . . are attached to the base 3. The base 3 is attached to the lower casing 12 through four vibration-isolating rubbers 29, 29, . . . .

The base 3 is comprised of a base plate 30 made of sheet metal. The base plate 30 is in the shape of a frame as a whole, and has a front short side section 31, a rear short side section 32, a right long side section 33, and a left long side section 34. The rear short side section 32 includes a right rear short side portion 32a extending leftward from a rear end of the right long side section 33, a left rear short side portion 32b extending rightward from a rear end of the left long side section 34, and a central coupling portion 32c coupling a rear edge of the right rear short side portion 32a and a rear edge of the left rear short side portion 32b. Thus, the rear short side section 32 is greatly cut out at the center thereof.

The spindle mechanism 21 includes a spindle motor, electromechanical components, etc., and holds and rotates an optical disc. The spindle mechanism 21 is fixed to the front short side section 31 of the base 3 with screws.

The first shaft 23 and the second shaft 24 are attached to the base 3 to be parallel to each other, with the spindle mechanism 21 interposed therebetween. Specifically, the first shaft 23 is arranged on the right of the spindle mechanism 21, and the second shaft 24 is arranged on the left of the spindle mechanism 21. Both of the shafts extend in the fore-aft direction. A front end of the first shaft 23 is attached to the base 3 through the helical torsion spring 4, and a rear end of the first shaft 23 is attached to the base 3 through the flat spring support 5. The ends of the second shaft 24 are both attached to the base 3 through the flat spring supports 5, 5, respectively. The first shaft 23 is an example shaft. Details of the structure for supporting the first and second shafts 23, 24 will be described later.

The lead screw 26 is coupled to the stepping motor 25 at a proximal end thereof, and is driven to rotate by the stepping motor 25. The stepping motor 25 is fixed to the right long side section 33 of the base 3 in such a manner that the lead screw 26 is adjacent to, and parallel to the first shaft 23. Specifically, the first shaft 23, the second shaft 24, and the lead screw 26 are parallel to each other. A distal end of the lead screw 26 is rotatably supported by the right long side section 33 of the base 3. A thread groove is formed in the lead screw 26.

The optical pickup 22 includes a body 22a containing a light source, an optical system, sensors, etc. First fitting sections 22b, 22b for fitting on the first shaft 23 are provided on a right end of the body 22a. A second fitting section 22c for fitting on the second shaft 24 is provided on a left end of the body 22a. A threaded portion 22d which is threadedly mounted on the thread groove of the lead screw 26 is integrated with the first fitting sections 22b. With the first and second fitting sections 22b, 22c fitted on the first and second shafts 23, 24, respectively, the optical pickup 22 is supported on the first and second shafts 23, 24 to be slidable along the first and second shafts 23, 24. In this state, the threaded portion 22d is threadedly mounted on the lead screw 26.

In the optical pickup 22 configured in this manner, the lead screw 26 is driven to rotate by the stepping motor 25. Then, the threaded portion 22d is guided by the thread groove of the lead screw 26, and travels in the axial direction of the lead screw 26. As the threaded portion 22d travels in the axial direction of the lead screw 26, the first fitting sections 22b, 22b also travel in the axial direction of the lead screw 26, i.e., in the axial direction of the first shaft 23. Thus, the optical pickup 22 travels in the axial direction of the first and second shafts 23, 24. As a result, the optical pickup 22 travels in the radial direction of the optical disc held by the spindle mechanism 21. The optical pickup 22, at a certain position on a radius of the optical disc, reads and records data from and in the optical disc rotated by the spindle mechanism 21.

<2. Structure for Supporting the First Shaft by the Flat Spring Support>

Figure 3:
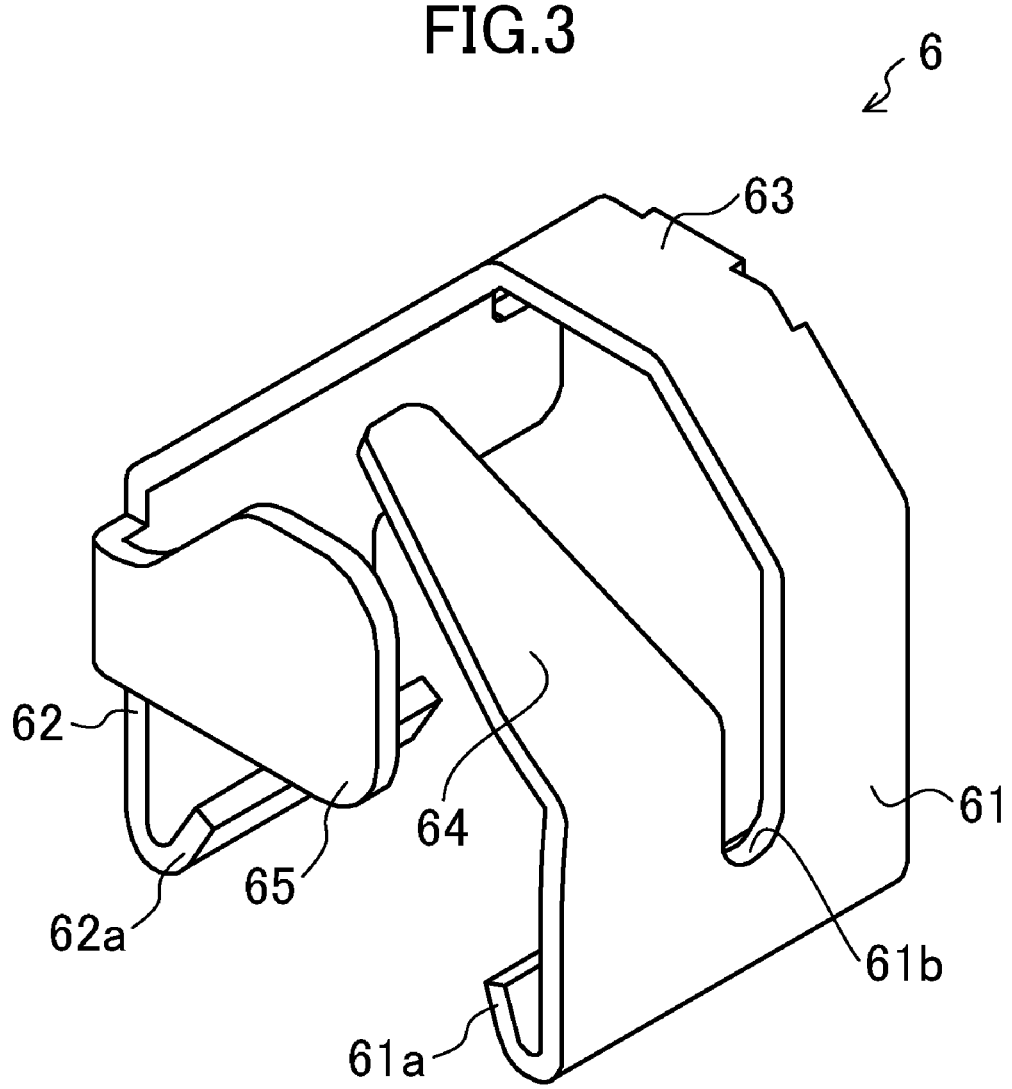
FIG. 3 is a perspective view of a flat spring.
Figure 4:
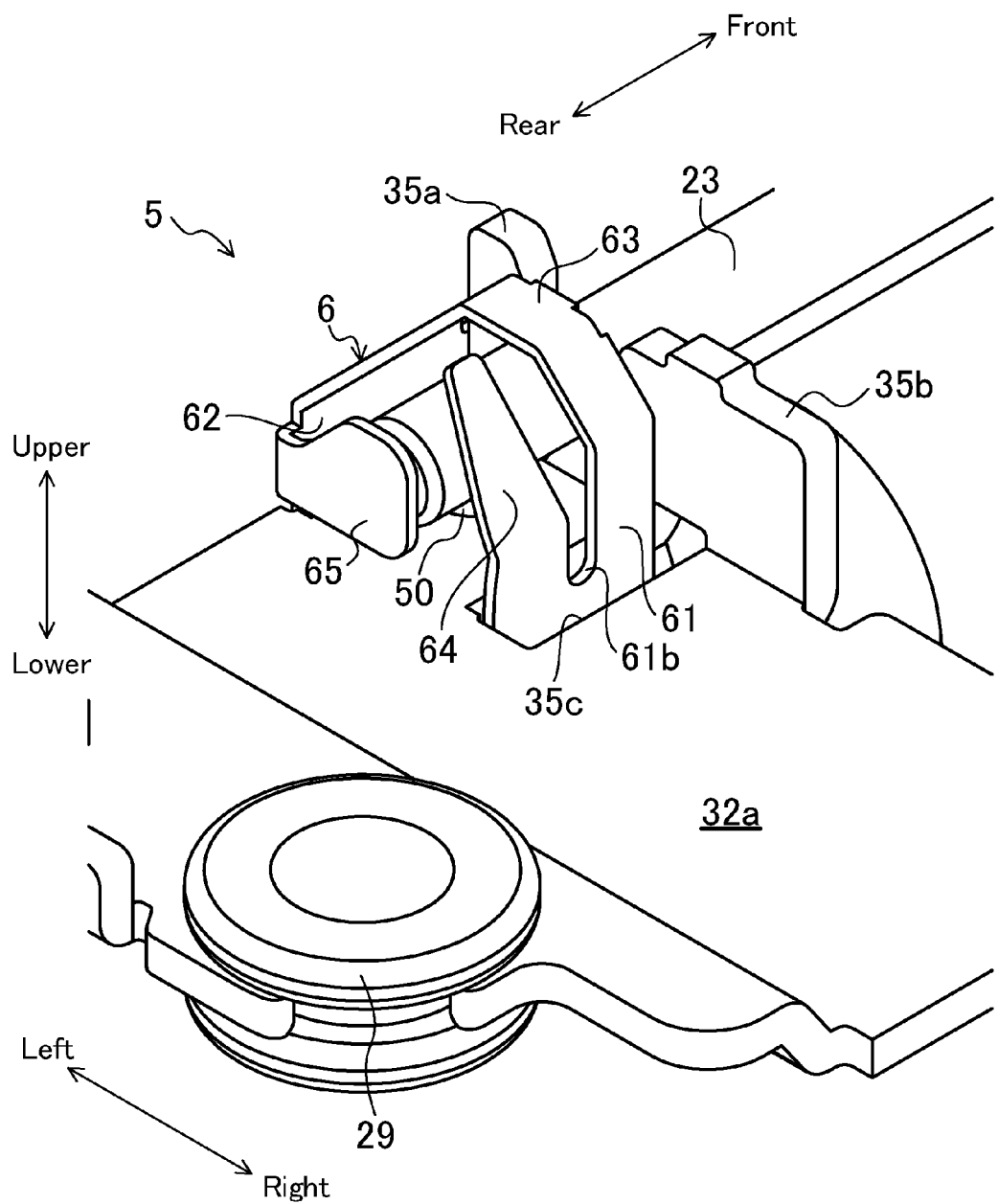
FIG. 4 is an enlarged perspective view illustrating the neighborhood of a rear end of a first shaft.
Figure 5:
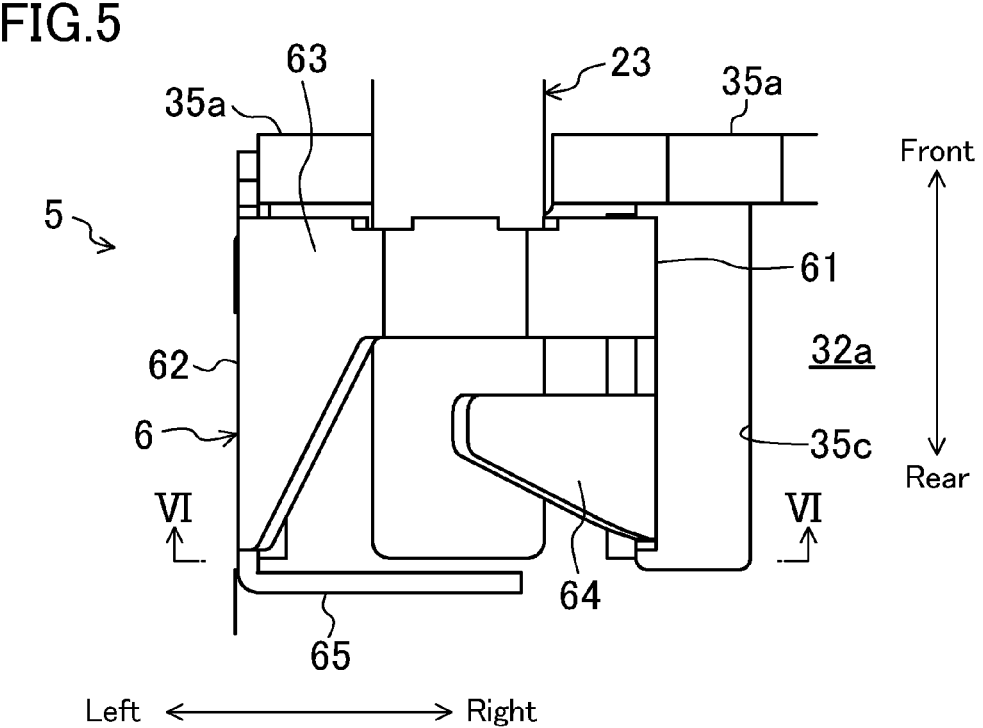
FIG. 5 is an enlarged plan view illustrating the neighborhood of the rear end of the first shaft as viewed from the top.
Figure 6:
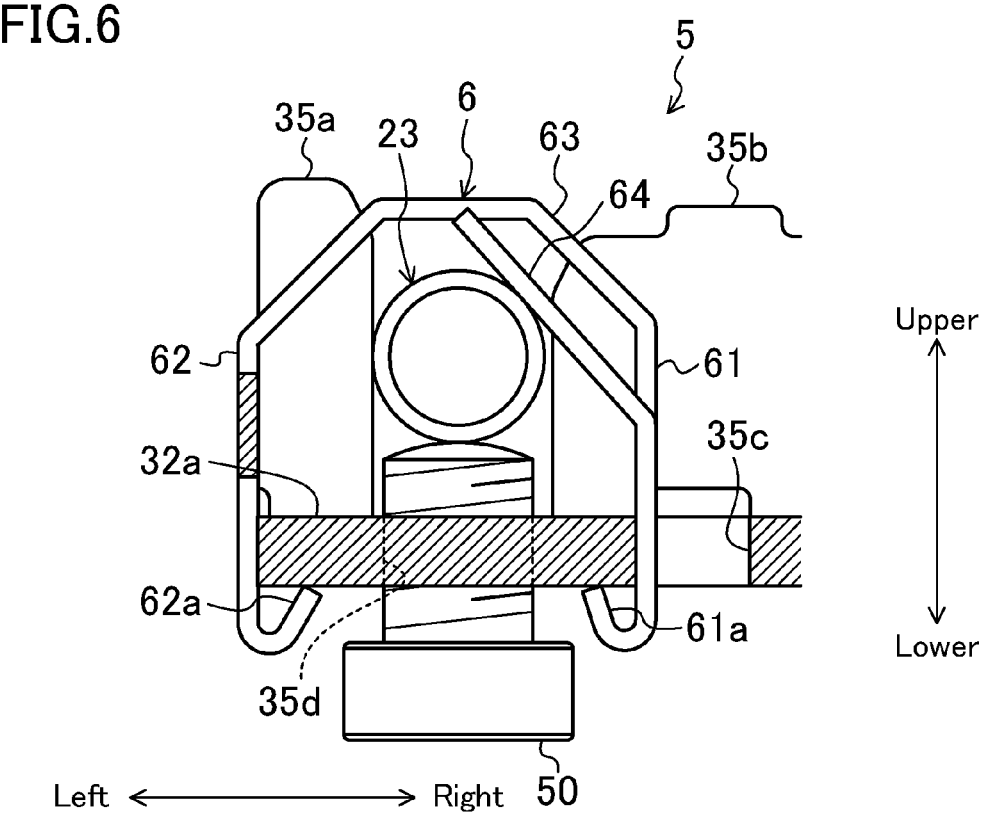
FIG. 6 is a cross-sectional view taken along the line VI-VI in FIG. 5.

A structure for supporting the first shaft 23 by the flat spring support 5 will be described below with reference to FIGS. 3 to 6. FIG. 3 is a perspective view of a flat spring, and FIG. 4 is an enlarged perspective view illustrating the neighborhood of a rear end of the first shaft 23. FIG. 5 is an enlarged plan view illustrating the neighborhood of the rear end of the first shaft 23 as viewed from the top, and FIG. 6 is a cross-sectional view taken along the line VI-VI in FIG. 5.

The flat spring support 5 includes a left vertical wall section 35a, and a right vertical wall section 35b both provided with the base 3, a flat spring 6 attached to the base 3, and a screw 50 threadedly mounted in the base 3.

The flat spring 6 includes a first vertical wall section 61, a second vertical wall section 62 opposite and parallel to the first vertical wall section 61, a coupling section 63 for coupling a front portion of an upper end of the first vertical wall section 61 and a front portion of an upper end of the second vertical wall section 62 above the first and second vertical wall sections 61, 62, a pressing section 64 extending obliquely upward from a rear portion of an upper end of the first vertical wall section 61 toward the second vertical wall section 62, and a restriction section 65 extending from a rear edge of the second vertical wall section 62 toward the first vertical wall section 61. The flat spring 6 is formed by bending a single sheet metal.

A folded section 61a is formed at a lower end of the first vertical wall section 61 by folding the lower end inside. Likewise, a folded portion 62a is formed at a lower end of the second vertical wall section 62 by folding the lower end inside. A notch 61b is formed in the first vertical wall section 61 between the coupling section 63 and the pressing section 64. The pressing section 64 is positioned inside the coupling section 63 in the flat spring 6 as shown in FIG. 6.

A left vertical wall section 35a, and a right vertical wall section 35b are vertically extending from the right rear short side portion 32a of the base 3. The left vertical wall section 35a and the right vertical wall section 35b are arranged on a left front corner of the right rear short side portion 32a. A distance between the left vertical wall section 35a and the right vertical wall section 35b is slightly greater than an outer diameter of the first shaft 23. An engagement hole 35c extending in the fore-aft direction is formed in the right rear short side portion 32a behind the right vertical wall section 35b. Further, a threaded hole 35d is formed to penetrate the right rear short side portion 32a on the left of the engagement hole 35c. The screw 50 is threadedly mounted in the threaded hole 35d from the back side of the right rear short side portion 32a (i.e., from the side of the right rear short side portion opposite the spindle mechanism 21).

Then, assembly of a structure for supporting the rear end of the first shaft 23 will be described.

The flat spring 6 is first attached to the right rear short side portion 32a of the rear short side section 32. Specifically, the folded portion 62a of the second vertical wall section 62 of the flat spring 6 is hooked on a left edge of the right rear short side portion 32a. Then, the folded section 61a of the first vertical wall section 61 of the flat spring 6 is inserted in the engagement hole 35c of the right rear short side portion 32a, and is engaged with the back surface of the right rear short side portion 32a.

Then, the rear end of the first shaft 23 is allowed to pass between the left vertical wall section 35a and the right vertical wall section 35b, and is inserted in the flat spring 6. In this state, there is a clearance that allows the first shaft 23 to move in the vertical direction within the flat spring 6. Then, the screw 50 is threadedly mounted in the threaded hole 35d in the right rear short side portion 32a from the back side. The threaded hole 35d is positioned below the first shaft 23. Therefore, by fastening the screw 50, a tip end of the screw 50 meets the first shaft 23, and pushes the first shaft 23 upward. Then, the first shaft 23 meets the pressing section 64 of the flat spring 6. As the screw 50 is further fastened, the pressing section 64 is elastically deformed, thereby pressing the first shaft 23 obliquely downward to the left. The elastic force of the pressing section 64 is divided into a leftward element and a downward element, which press the first shaft 23 toward the left vertical wall section 35a and the screw 50, respectively. In this way, the rear end of the first shaft 23 is supported at three points of the pressing section 64, the left vertical wall section 35a, and the screw 50, thereby restricting the radial movement of the shaft. In this case, the restriction section 65 of the flat spring 6 exists axially behind a rear end face of the first shaft 23. That is, the rear end face of the first shaft 23 faces the restriction section 65. Therefore, even if the first shaft 23 travels rearward in the axial direction, the first shaft 23 abuts the restriction section 65, thereby restricting the shaft from further moving rearward in the axial direction. The rear end face of the first shaft 23 and the restriction section 65 of the flat spring 6 may be brought into contact with each other in advance.

In this state, the right vertical wall section 35b is not in contact with the first shaft 23, and therefore, it may be omitted. However, the provision of the right vertical wall section 35b is preferable because it stabilizes the first shaft 23 in placing the first shaft 23 in the flat spring 6, thereby allowing for easy assembly.

The order of the assembly is not limited to that described above. The assembly can be done in any order as long as the assembly can be completed. For example, with the rear end of the first shaft 23 inserted in the flat spring 6, the flat spring 6 may be attached to the right rear short side portion 32a. Further, the screw 50 may be threadedly mounted in the right rear short side portion 32a in advance.

<3. Structure for Supporting the First Shaft by the Helical Torsion Spring>

Figure 7:
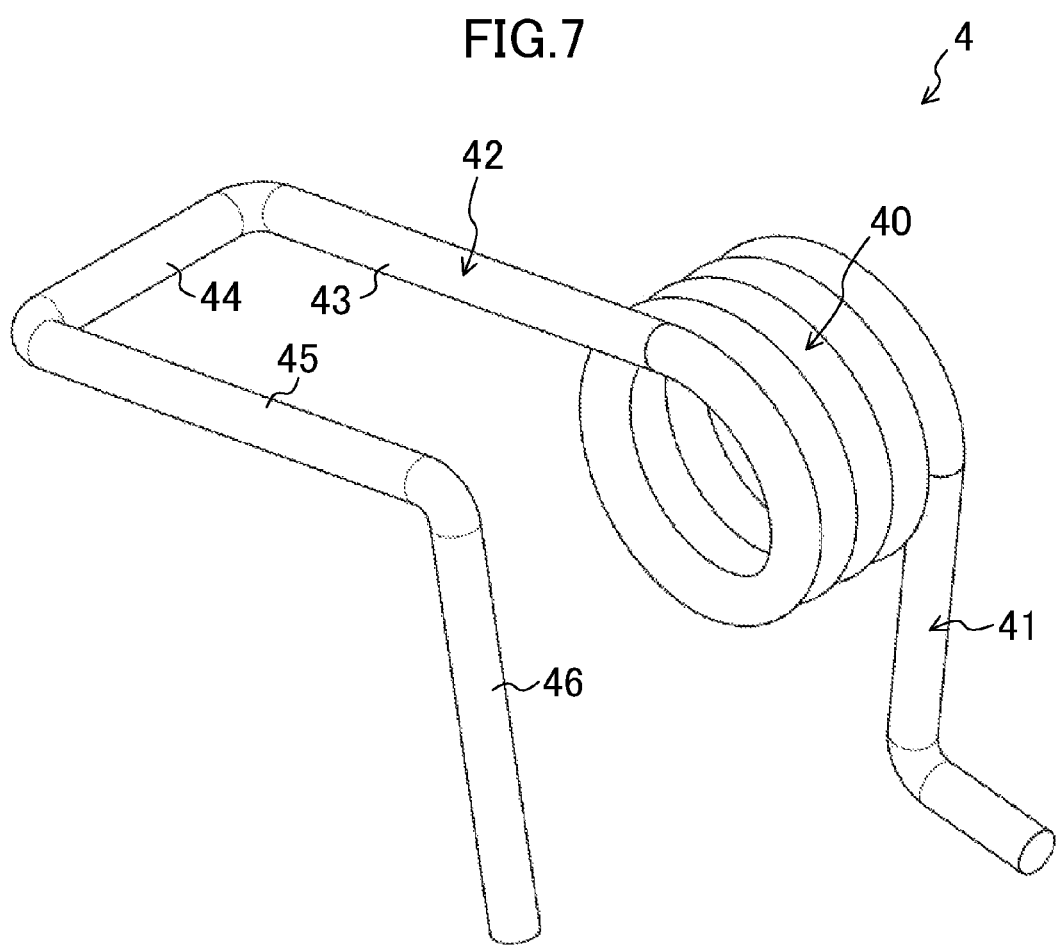
FIG. 7 is a perspective view of a helical torsion spring.
Figure 8:
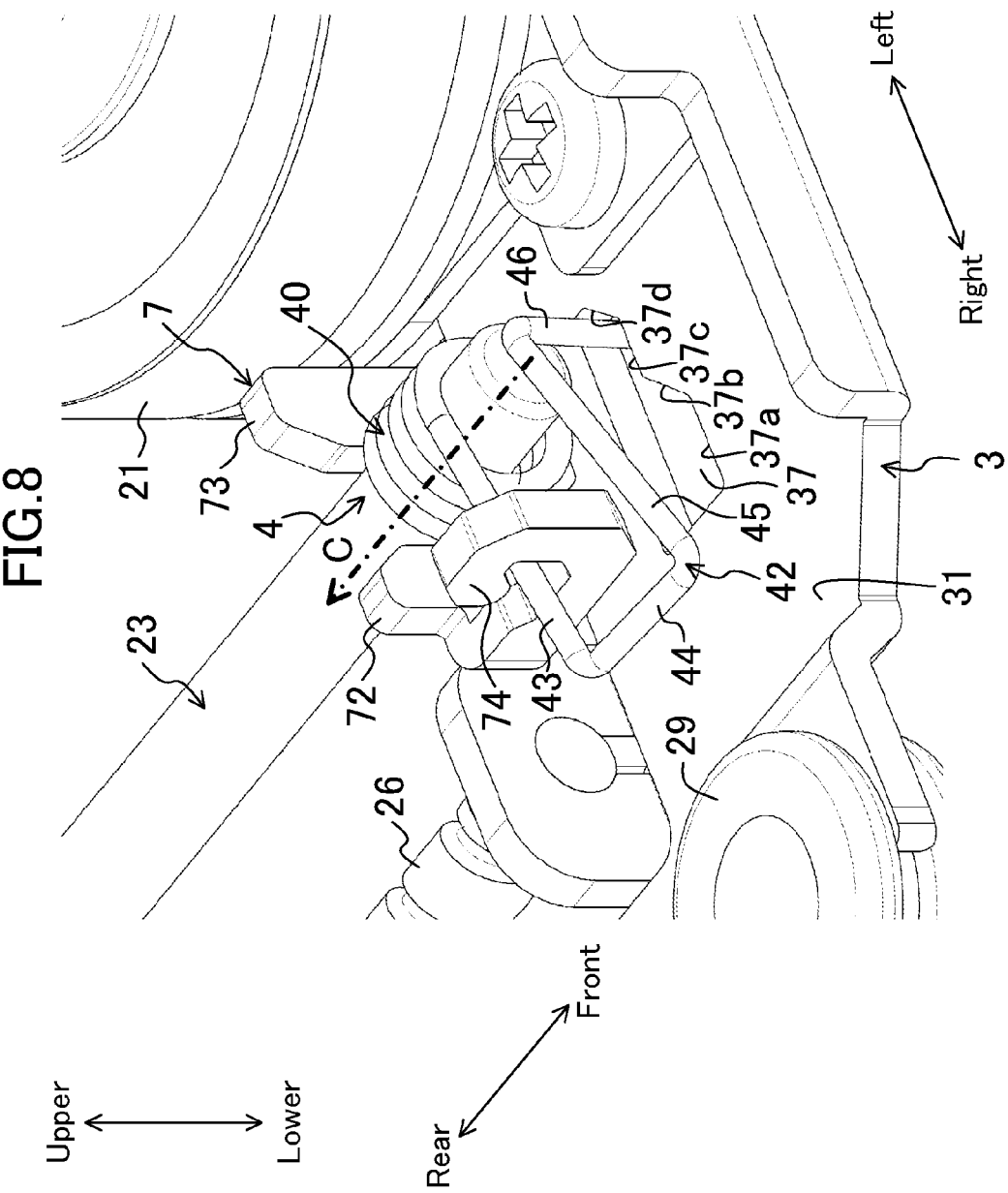
FIG. 8 is an enlarged perspective view illustrating the neighborhood of a front end of the first shaft.
Figure 9:
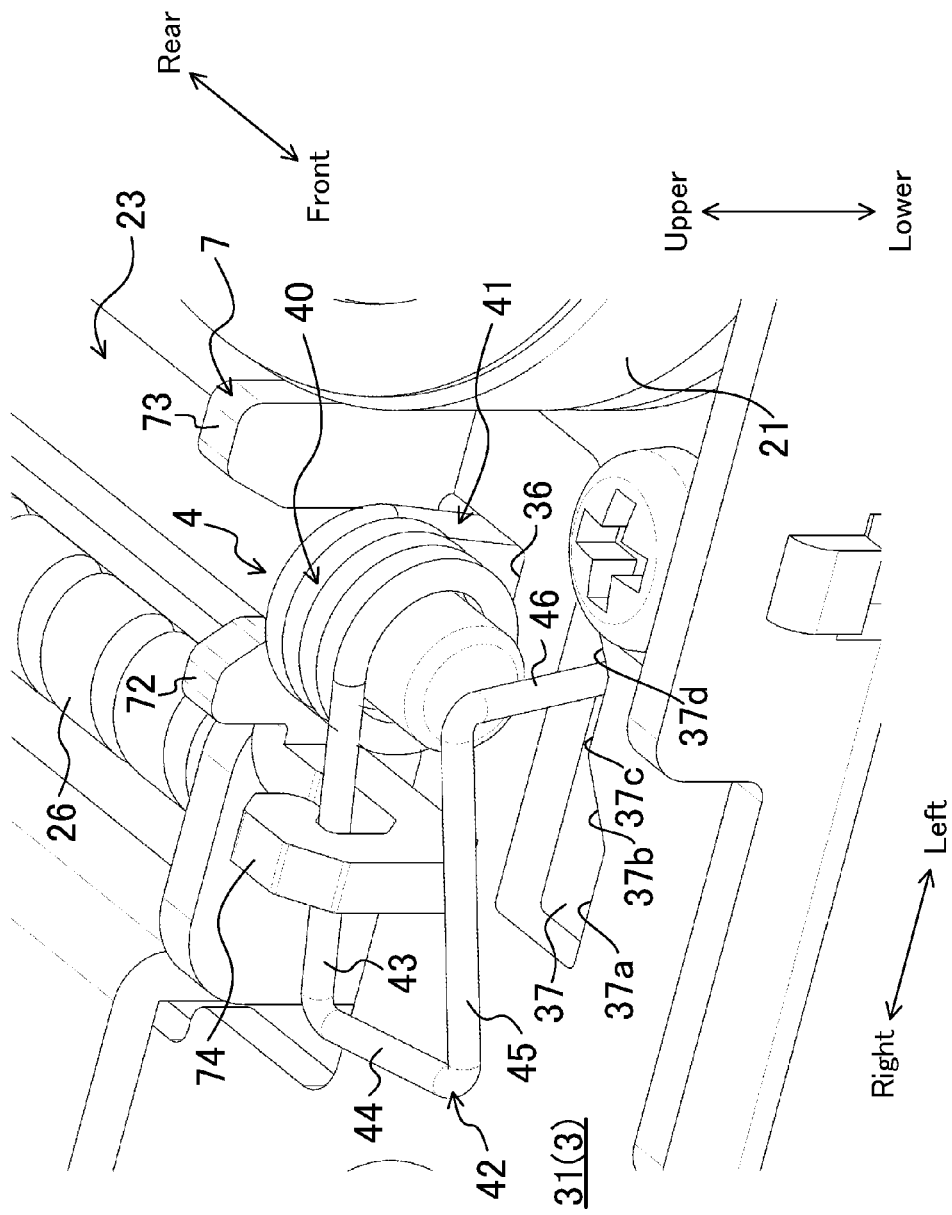
FIG. 9 is an enlarged perspective view illustrating the neighborhood of the front end of the first shaft as viewed from a different angle.
Figure 10:
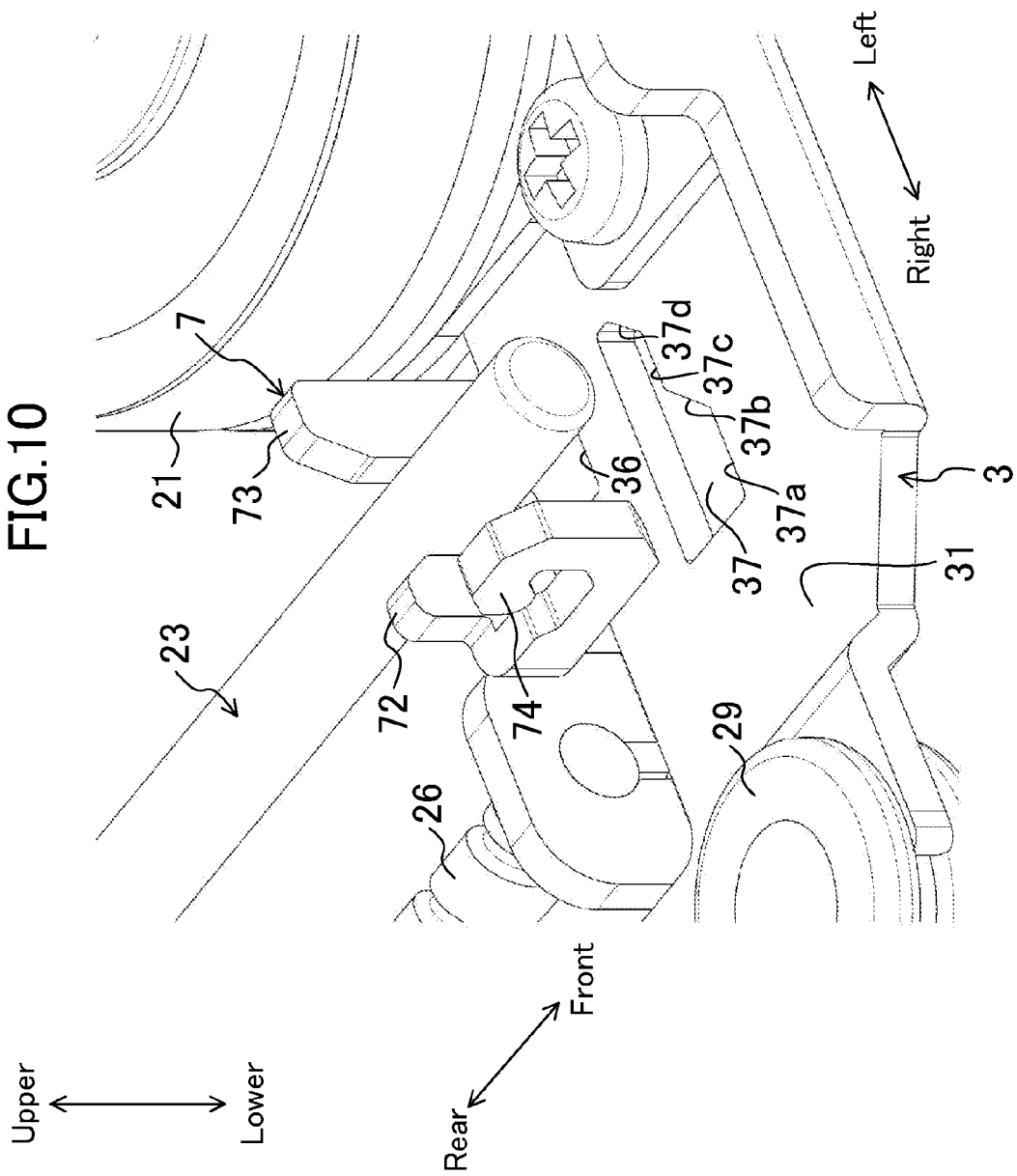
FIG. 10 is an enlarged perspective view corresponding to FIG. 8 with the helical torsion spring detached.
Figure 11:
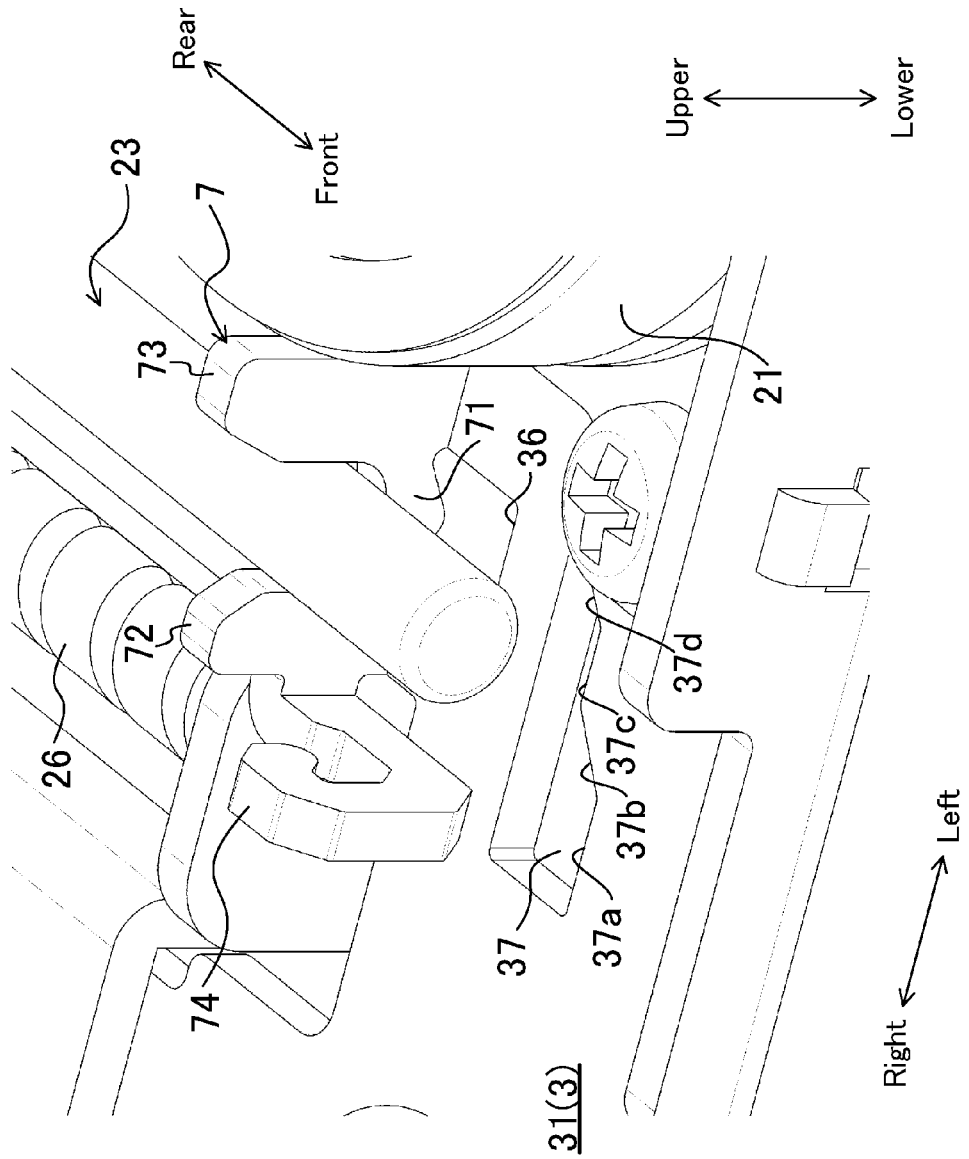
FIG. 11 is an enlarged perspective view corresponding to FIG. 9 with the helical torsion spring detached.
Figure 12:
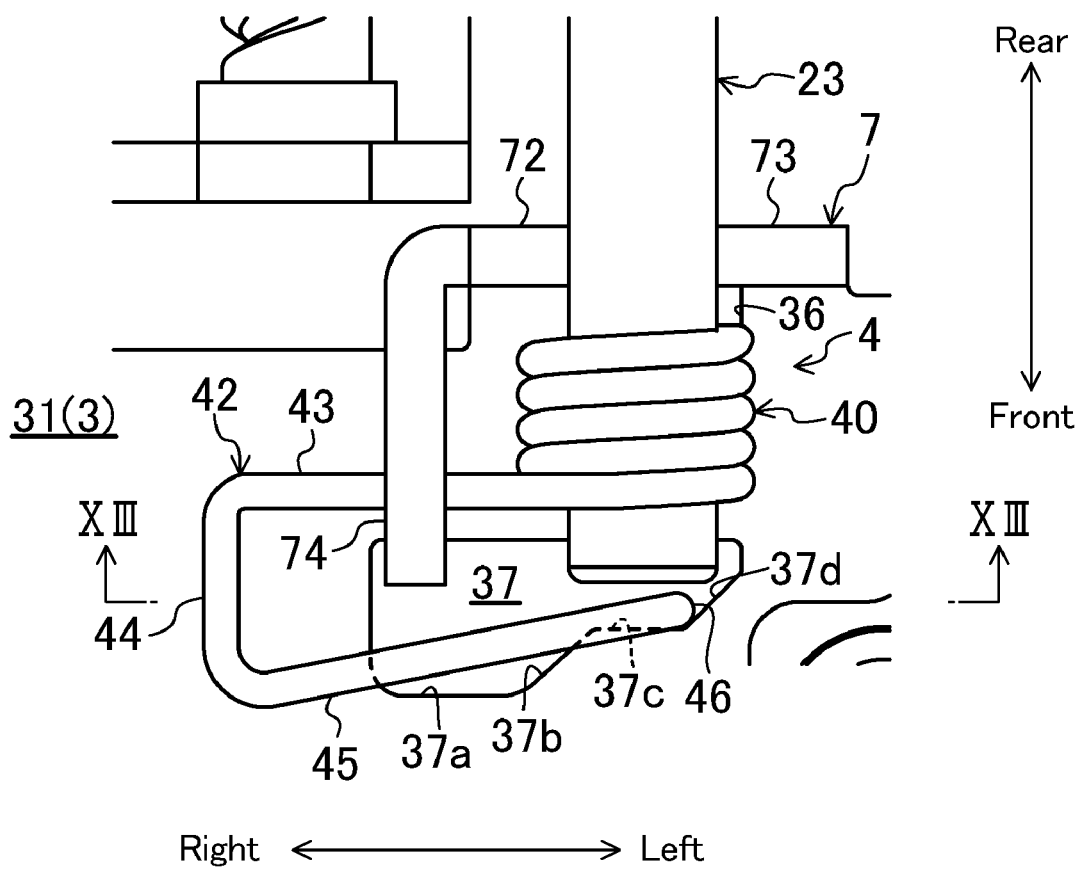
FIG. 12 is an enlarged plan view illustrating the neighborhood of the front end of the first shaft as viewed from the top.
Figure 13:
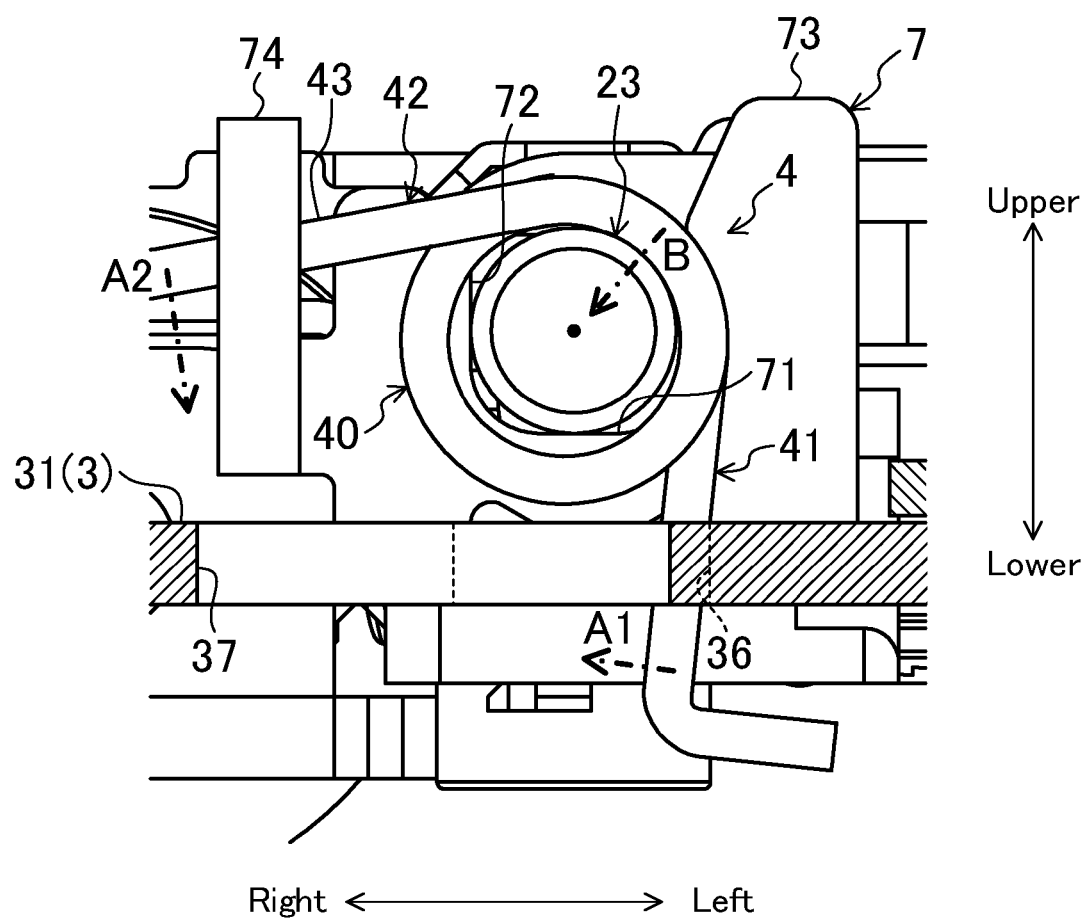
FIG. 13 is a cross-sectional view taken along the line XIII-XIII in FIG. 12.

A structure for supporting the first shaft 23 by the helical torsion spring 4 will be described in detail with reference to FIGS. 7 to 13. FIG. 7 is a perspective view of the helical torsion spring 4, FIG. 8 is an enlarged perspective view illustrating the neighborhood of a front end of the first shaft 23, and FIG. 9 is an enlarged perspective view illustrating the neighborhood of the front end of the first shaft 23 as viewed from a different angle. FIG. 10 is an enlarged perspective view corresponding to FIG. 8 with the helical torsion spring 4 detached, FIG. 11 is an enlarged perspective view corresponding to FIG. 9 with the helical torsion spring 4 detached, FIG. 12 is an enlarged plan view illustrating the neighborhood of the front end of the first shaft 23 as viewed from the top, and FIG. 13 is a cross-sectional view taken along the line XIII-XIII in FIG. 12.

The helical torsion spring 4 is made of metal. As shown in FIG. 7, the helical torsion spring 4 includes a coil section 40 wound in the shape of a coil, a first arm section 41 extending from an end of the coil section 40 in the tangential direction of the coil section 40, and a second arm section 42 extending from the other end of the coil section 40 in the tangential direction of the coil section 40. An inner diameter of the coil section 40 is larger than the outer diameter of the first shaft 23. That is, the first shaft 23 can be inserted in the coil section 40. A tip end of the first arm section 41 is bent in the direction opposite the coil section 40 as viewed in the axial direction of the coil section 40 (see FIG. 13). The second arm section 42 includes a tangential portion 43 tangentially extending from the other end of the coil section 40, and an axial portion 44 which is bent from a tip end of the tangential portion 43, and extends in the axial direction of the coil section 40, a parallel portion 45 which is bent from a tip end of the axial portion 44, and extends parallel to the tangential portion 43, and a crossing portion 46 which is bent from a tip end of the parallel portion 45, and extends across the coil section 40 as viewed in the axial direction of the coil section (see FIG. 13). As viewed in the axial direction of the coil section 40 (see FIG. 13), the tangential portion 43 of the second arm section 42 extends in a certain direction, thereby forming an angle slightly larger than 90 degrees with the first arm section 41. The helical torsion spring 4 is an example coil spring.

The front short side section 31 of the base 3 is provided with a bearing 7 on the right of the spindle mechanism 21. The bearing 7 is formed by bending a portion of the front short side section 31, and is substantially perpendicular to the front short side section 31. The bearing 7 includes a bottom wall section 71 coupled to the front short side section 31, and is parallel to the front short side section 31, a right vertical wall section 72 and a left vertical wall section 73 extending upward from both ends of the bottom wall section 71, respectively. Specifically, the bearing 7 is substantially in the shape of U, and is opened upward. An inner surface of the U-shaped bearing 7 functions as a bearing.

A hooked section 74 extends forward from the right vertical wall section 72. The hooked section 74 has a hooked tip end. Specifically, the hooked section 74 extends forward from the right vertical wall section 72, and then it is bent upward, rearward, and downward. In this way, the tip end of the hooked section 74 is in the shape of a hook opened rearward. The hooked section 74 is an example second engagement section.

A first engagement hole 36 penetrating the front short side section 31 of the base 3 is formed forward of the bearing 7. The first engagement hole 36 is substantially square-shaped. The first engagement hole 36 is an example first engagement section.

The front short side section 31 further includes a second engagement hole 37 formed forward of the first engagement hole 36 and the hooked section 74. Specifically, the second engagement hole 37 is an elongated hole extending in the right and left direction, i.e., in the direction orthogonal to the axial direction of the first shaft 23 when viewed in plan. A front edge of the second engagement hole 37 is stepped in such a manner that the second engagement hole 37 is gradually tapered toward the left. Specifically, the front edge of the second engagement hole 37 includes a first parallel portion 37a extending parallel to the rear edge (i.e., in the right and left direction) at the rightmost position, a first inclined portion 37b extending obliquely rearward from the left end of the first parallel portion 37a to the left, a second parallel portion 37c extending parallel to the rear edge (i.e., in the horizontal direction) from the left end of the first inclined portion 37b, and a second inclined portion 37d extending obliquely rearward to the left from the left end of the second parallel portion 37c. When viewed in plan, the second parallel portion 37c is positioned forward of the bottom wall section 71 of the bearing 7. The second engagement hole 37 is an example third engagement section.

Assembly of the structure for supporting the front end of the first shaft 23 will be described below.

First, the first shaft 23 is placed on the bearing 7 from above to be in contact with the inner surface of the bearing 7.

Then, the coil section 40 of the helical torsion spring 4 is fitted on the front end of the first shaft 23 from the front. In this case, the coil section 40 is fitted on the first shaft 23 with the first arm section 41 positioned rearward, and the second arm section 42 positioned forward. In fitting the coil section 40 on the first shaft 23, the tip end of the first arm section 41 is inserted in the first engagement hole 36 of the base 3.

In this state, the tangential portion 43, the axial portion 44, and the parallel portion 45 of the second arm section 42 of the helical torsion spring 4 extend obliquely upward to the right from the first shaft 23, and is positioned above the hooked section 74 of the base 3. A tip end of the crossing portion 46 of the helical torsion spring 4 is inserted in the second engagement hole 37 of the base 3.

Then, the second arm section 42 is pushed downward toward the base 3, and the tangential portion 43 of the second arm section 42 is engaged with the hooked section 74. In this case, in the axial direction of the first shaft 23 (i.e., in the fore-aft direction), the tangential portion 43 of the second arm section 42 is positioned forward of the tip end of the hooked section 74. Therefore, the tangential portion 43 is pushed downward in the obliquely rearward direction. After the tangential portion 43 is sufficiently pushed down, the tangential portion 43 is moved forward, and is engaged with the hooked section 74 from the rear side.

In this state, as shown in FIG. 13, the first arm section 41 is engaged with the first engagement hole 36 of the base 3, and receives a force in the direction of an arrow A1 from an edge of the first engagement hole 36. The second arm section 42 is engaged with the hooked section 74, and receives a force in the direction of an arrow A2 from the hooked section 74. As a result, the coil section 40 is biased to be tighten in the winding direction, thereby pressing the first shaft 23 in the direction of a bisector which bisects an angle formed between the first and second arm sections 41 and 42 (in the direction of an arrow B). The arrow B indicates a direction obliquely downward to the right. The elastic force of the helical torsion spring 4 is divided into a rightward element and a downward element, which press the first shaft 23 toward the right vertical wall section 72 and the bottom wall section 71 of the bearing 7, respectively. In this way, the front end of the first shaft 23 is supported at three points of the helical torsion spring 4, and the right vertical wall section 72 and the bottom wall section 71 of the bearing 7. This restricts the radial movement of the shaft.

With the first shaft 23 supported by the helical torsion spring 4, the left vertical wall section 73 is not in contact with the first shaft 23, and therefore, it may be omitted. However, the provision of the left vertical wall section 73 is preferable because it stabilizes the first shaft 23 in placing the first shaft on the bearing 7, thereby allowing for easy assembly.

When engaging the second arm section 42 with the hooked section 74, the crossing portion 46 of the second arm section 42 travels to the left within the second engagement hole 37 along the front edge thereof. Specifically, when the coil section 40 is merely fitted on the first shaft 23, the crossing portion 46 is in contact with the first parallel portion 37a or the first inclined portion 37b of the second engagement hole 37. As the second arm section 42 is pushed downward, the crossing portion 46 travels to the left along the first inclined portion 37b and the second parallel portion 37c of the second engagement hole 37. When the second arm section 42 is finally engaged with the hooked section 74, the crossing portion 46 is positioned at a corner formed by the second parallel portion 37c and the second inclined portion 37d of the second engagement hole 37. As a result, the crossing portion 46 is positioned axially forward of the front end face (i.e., an axial end face) of the first shaft 23. Specifically, the crossing portion 46 is positioned to face the front end face of the first shaft 23. Since the crossing portion 46 is engaged with the second parallel portion 37c of the second engagement hole 37, the forward movement of the crossing portion 46 is restricted. Further, in the second arm section 42, the tangential portion 43 at the side of the proximal end of the crossing portion 46 is engaged with the hooked section 74, and the forward movement of the tangential portion 43 is restricted. Therefore, even if the first shaft 23 travels forward in the axial direction, the first shaft 23 abuts the crossing portion 46 of the second arm section 42, and is pushed rearward in the axial direction by the elastic force of the tangential portion 43, the axial portion 44, the parallel portion 45, and the crossing portion 46 of the second arm section 42 (see an arrow C in FIG. 8). In this way, the forward movement of the first shaft 23 in the axial direction is restricted. The front end of the first shaft 23 and the crossing portion 46 of the helical torsion spring 4 may be brought into contact with each other in advance.

The order of the assembly is not limited to that described above. The assembly can be done in any order as long as the assembly can be completed. For example, with the helical torsion spring 4 fitted on an end of the first shaft 23, the first shaft 23 may be placed on the bearing 7, while inserting a tip end of the first arm section 41 of the helical torsion spring 4 in the first engagement hole 36 of the base 3.

The structure for supporting the front end of the first shaft 23, and the structure for supporting the rear end may be assembled in any order. For example, the assembly may be done by supporting the rear end of the first shaft 23 by the flat spring support 5 with the screw 50 not fastened yet, supporting the front end of the first shaft 23 by the helical torsion spring 4, and then fastening the screw 50. The tilt of the first shaft 23 in the pitch direction (i.e., the tilt in the vertical direction) can be adjusted by the screw 50 at the rear end relative to the bearing 7 at the front end.

Both of the front and rear ends of the second shaft 24 are supported by the flat spring support 5, 5. Therefore, the tilt of the second shaft 24 in the pitch direction can be adjusted by both of a screw (not shown) of the flat spring support 5 at the front end, and a screw (not shown) of the flat spring support 5 at the rear end.

Thus, according to the present embodiment, the first arm section 41 and the second arm section 42 of the helical torsion spring 4 are engaged with the base 3 in such a manner that the coil section 40 is tightened, thereby press-supporting the first shaft 23 onto the bearing 7. Specifically, the first shaft 23 can be supported at three points of the coil section 40 of the helical torsion spring 4, and the bottom wall section 71 and the right vertical wall section 72 of the bearing 7 of the base 3. This allows for restriction of the radial movement of the first shaft 23. In this case, due to the presence of the second arm section 42 in front of the first shaft 23 in the axial direction, the first shaft 23, even if it moves forward in the axial direction, comes into contact with the second arm section 42. Thus, the axial movement of the first shaft 23 can be restricted. This can prevent the first shaft 23 from moving forward, and can prevent the rear end of the first shaft 23 from detaching from the flat spring support 5. In this way, the radial and axial movements of the first shaft 23 can be restricted by an easy structure of the bearing 7 and the helical torsion spring 4.

In this case, the forward movement of the second arm section 42 is restricted because the tangential portion 43 is engaged with the hooked section 74 of the base 3. Specifically, even if the first shaft 23 moves forward, and comes into contact with the crossing portion 46 of the second arm section 42, the movement of the first shaft 23 can be stopped by the crossing portion 46 because the forward movement of the helical torsion spring 4 is restricted.

The crossing portion 46 of the second arm section 42 facing the front end face of the first shaft 23 is engaged with the front edge of the second engagement hole 37 of the base 3. Therefore, the axial forward movement of the first shaft 23 can be stopped by the base 3. Specifically, as compared with the structure in which the crossing portion 46 is constituted as a free end, the axial forward movement of the first shaft 23 can be restricted by a greater force.

With the first shaft 23 penetrating the coil section 40 of the helical torsion spring 4, the pressing force of the helical torsion spring 4 due to the engagement between the first arm section 41 and the second arm section 42, and the base 3 can sufficiently be transmitted to the first shaft 23. Specifically, when the first arm section 41 and the second arm section 42 are biased to tighten the coil section 40, a great biasing force is applied to the ends of the coil section 40 close to the first arm section 41 and the second arm section 42, i.e., the axial ends of the coil section 40. Since the first shaft 23 penetrates the coil section 40, the axial ends of the coil section 40 are wound around the first shaft 23. With the axial ends of the coil section 40 wound around the first shaft 23, the pressing force of the helical torsion spring 4 can efficiently be transmitted to the first shaft 23. As a result, the radial movement of the first shaft 23 can be restricted by a greater force.

With the second arm section 42 folded back, the tip end of the second arm section 42 can easily be positioned in front of the first shaft 23 in the axial direction. Since the second arm section 42 has the folded-back portion, a finger can be put on the folded-back portion in pressing the second arm section 42 to be engaged with the element of the base 3 (i.e., the hooked section 74). This improves operability in pressing the second arm section 42.

The helical torsion spring 4 is merely fitted on the first shaft 23, and is engaged with the base 3, thereby improving ease of assembly. Specifically, even if the helical torsion spring 4 is not attached to the first shaft 23 in advance, the structure for supporting the first shaft 23 can be assembled by placing the first shaft 23 on the bearing 7, fitting the helical torsion spring 4 on the first shaft 23, and then engaging the helical torsion spring 4 with the base 3. That is, in placing the first shaft 23 on the bearing 7, the first shaft 23 does not receive any external force such as an elastic force, etc., and therefore, the first shaft 23 can easily be placed on the bearing 7.

[Other Embodiments]

The above-described embodiment of the invention may be modified in the following manner.

In the above-described embodiment, the shaft supporting structure in the optical disc apparatus 10 has been described. However, the invention is not limited to the above-described structure. For example, the shaft supporting structure of the embodiment may be applied to a shaft for slidably supporting a head of a printing apparatus. That is, the shaft supporting structure of the present embodiment may be applied to any shaft as long as the shaft is a member for supporting an object.

The base 3 is an example of a foundation for supporting the first shaft 23, and its structure is not limited to that described above. For example, the base 3 is not always made of sheet metal, and may be made of a block-like member.

The rear end of the first shaft 23, and the both ends of the second shaft 24 are supported by the flat spring supports 5, 5, . . . , respectively. However, the supporting structure is not limited thereto. Specifically, any structure can be used as long as it can restrict the axial and radial movements of the rear end of the first shaft 23, and the both ends of the second shaft relative to the base 3. The rear end of the first shaft 23, and the both ends of the second shaft 24 may be supported by the helical torsion spring 4.

The first shaft 23 is inserted in the coil section 40 to penetrate the coil section 40. However, the first shaft 23 may not penetrate the coil section 40. Specifically, every part of the coil section 40 is not necessarily wound around the first shaft 23.

The coil section 40 includes many turns, but may include only a single turn. In this specification, the term "coil" designates a coil including at least a single turn.

The first and second arm sections 41, 42 extend in the tangential direction of the coil section 40. However, the direction of extension is not limited thereto. For example, the first and second arm sections 41, 42 may extend in the direction away from the coil section 40 relative to the tangential direction of the coil section 40, as viewed in the axial direction of the coil section 40, i.e., they may extend radially outward. Alternatively, they may extend radially inward relative to the tangential direction of the coil section 40, i.e., they may extend across the coil section 40.

Figure 14:
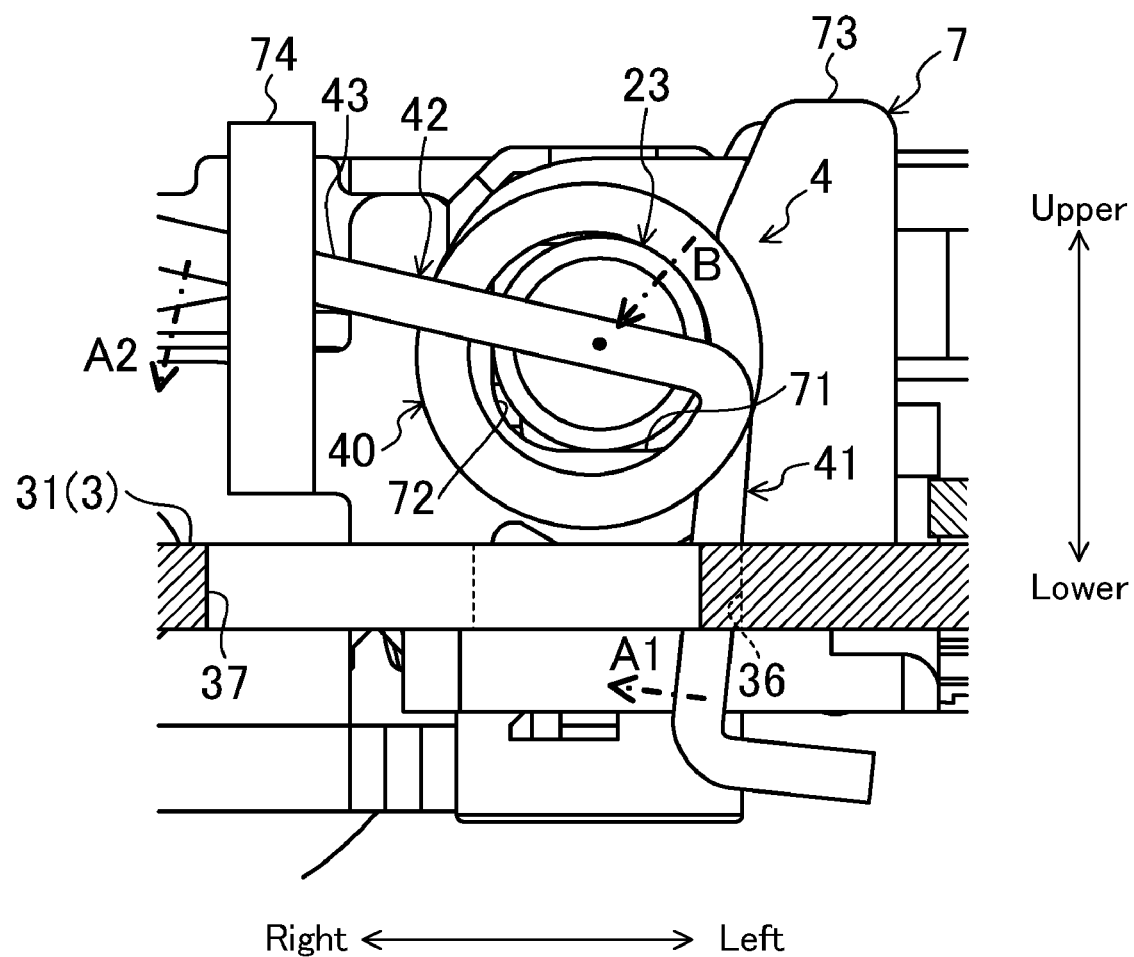
FIG. 14 is a cross-sectional view corresponding to FIG. 13 illustrating a structure for supporting the front end of the first shaft according to another embodiment.
Figure 15:
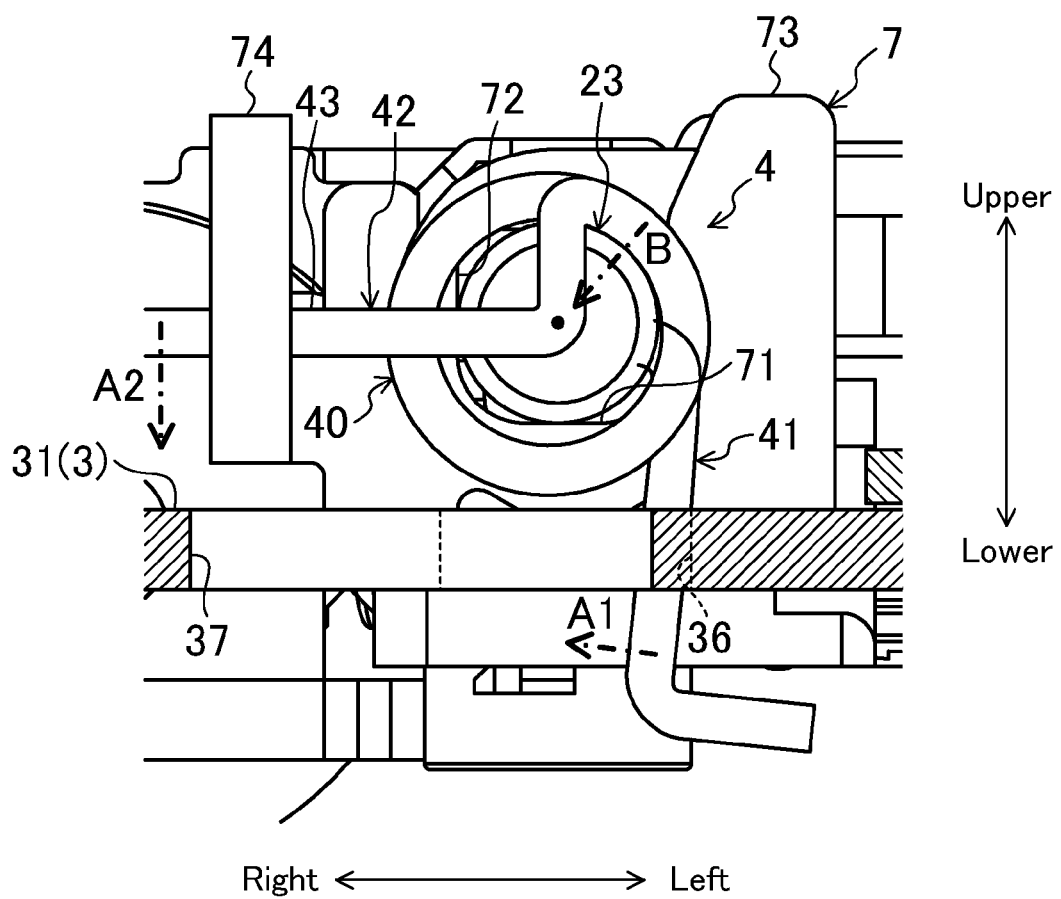
FIG. 15 is a cross-sectional view corresponding to FIG. 13 illustrating a structure for supporting the front end of the first shaft according to still another embodiment.

For example, the second arm section 42 may extend from an end of the coil section 40 to cross the coil section 40 as viewed in the axial direction of the coil section 40. Specifically, as shown in FIG. 14, the second arm section 42 may extend inward in the radial direction of the coil section 40 from the end of the coil section 40 so as to cross the coil section 40. Alternatively, as shown in FIG. 15, the second arm section 42 may extend inward in the radial direction of the coil section 40 from the end of the coil section 40, may be bent at about 90 degrees near the axial center of the coil section 40, and may extend outward in the radial direction of the coil section 40 so as to cross the coil section 40. In any case, the first shaft 23 does not penetrate the coil section 40, and the outermost turn at the front of the coil section 40 in the axial direction is not wound around the first shaft 23. That is, a portion of the second arm section crossing the coil section 40 is in front of the first shaft 23 in the axial direction, and faces the front end face of the first shaft 23 in the axial direction. In this case, the hooked section 74 functions to bias the second arm section 42 in the direction in which the coil section 40 is tightened, and to restrict the forward movement of the second arm section 42. Therefore, the axial portion 44, the parallel portion 45, and the crossing portion 46 of the second arm section 42, and the second engagement hole 37 of the base 3 may be omitted. Even if they are omitted, the forward movement of the second arm section 42 is restricted by the hooked section 74. Therefore, even if the first shaft 23 moves forward to abut the second arm section 42, the first shaft 23 can be prevented from further moving forward.

The first engagement hole 36 of the base 3 is not limited to a hole-shaped configuration as long as the first arm section 41 of the helical torsion spring 4 can be biased to tighten the coil section 40. Likewise, the second engagement hole 37 of the base 3 is not limited to a hole-shaped configuration as long as the forward movement of the crossing portion 46 of the second arm section 42 of the helical torsion spring 4 can be restricted. In any case, for example, the hole may be replaced with a rib or a block vertically extending from the base 3. The rib and the block may not necessarily be integrated with the base 3. They may be separated members attached to the base 3.

The hooked section 74 is not limited to that described above. Specifically, the hooked section 74 may not necessarily be integrated with the bearing 7, and may be fixed to the base 3. Specifically, the hooked section 74 may be integrated with the base plate 30 of the base 3, or may be constituted as a member separated from the base plate 30, and may be attached to the base plate 30.

The above-described embodiments are merely preferred embodiments in nature, and are not intended to limit the scope, applications, and use of the invention.

Industrial Applicability

As described above, the present invention is useful for a shaft supporting structure including a base provided with a bearing, and a shaft arranged at the bearing of the base.

Description Of Reference Characters

10 Optical disc apparatus
22 Optical pickup
23 First shaft (shaft)
3 Base
36 First engagement hole (first engagement section)
37 Second engagement hole (third engagement section)
4 Helical torsion spring (coil spring)
40 Coil section
41 First arm section
42 Second arm section
7 Bearing
74 Hooked section (second engagement section)

The invention claimed is:

1. A shaft supporting structure including a base provided with a bearing, and a shaft arranged at the bearing, the shaft supporting structure comprising:
   a coil spring including a coil section fitted on the shaft, and a first arm section and a second arm section extending from both ends of the coil section, respectively, wherein
   the base includes a first engagement section, and a second engagement section for engaging with the first arm section, and the second arm section of the coil spring, respectively,
   the coil spring presses the shaft onto the bearing in a radial direction of the shaft by an elastic force generated by engagement between the first arm section and the first engagement section of the base, and engagement between the second arm section and the second engagement section of the base, and
   a portion of the second arm section faces an axial end face of the shaft to restrict axial movement of the shaft by abutting the axial end face of the shaft.

2. The shaft supporting structure of claim 1, wherein
at least one of the first and second arm sections is restricted from moving in a direction in which the coil section is detached from the shaft by an engaging one of the first and second engagement sections.

3. The shaft supporting structure of claim 1, wherein
the base includes a third engagement section engaging with a tip end of the second arm section, and
a portion of the second arm section between a portion of the second arm section engaging with the second engagement section, and a portion of the second arm section engaging with the third engagement section faces the axial end face of the shaft.

4. The shaft supporting structure of claim 1, wherein the shaft penetrates the coil section of the coil spring.

5. An optical disc apparatus comprising:
the shaft supporting structure of claim 1; and
an optical pickup slidably supported on the shaft.

* * * * *